US012136213B2

(12) United States Patent
Chavez Badiola

(10) Patent No.: US 12,136,213 B2
(45) Date of Patent: Nov. 5, 2024

(54) METHOD BASED ON IMAGE CONDITIONING AND PREPROCESSING FOR HUMAN EMBRYO CLASSIFICATION

(71) Applicant: Alejandro Chavez Badiola, Guadalajara (MX)

(72) Inventor: Alejandro Chavez Badiola, Guadalajara (MX)

(73) Assignee: Conceivable Life Sciences Inc., New York, NY (US)

( * ) Notice: Subject to any disclaimer, the term of this patent is extended or adjusted under 35 U.S.C. 154(b) by 320 days.

(21) Appl. No.: 17/787,546

(22) PCT Filed: Dec. 20, 2019

(86) PCT No.: PCT/MX2019/000144
§ 371 (c)(1),
(2) Date: Jun. 20, 2022

(87) PCT Pub. No.: WO2021/125929
PCT Pub. Date: Jun. 24, 2021

(65) Prior Publication Data
US 2022/0392062 A1 Dec. 8, 2022

(51) Int. Cl.
*G06T 7/00* (2017.01)
(52) U.S. Cl.
CPC .. *G06T 7/0012* (2013.01); *G06T 2207/10061* (2013.01); *G06T 2207/20081* (2013.01); *G06T 2207/20084* (2013.01); *G06T 2207/30024* (2013.01); *G06T 2207/30044* (2013.01)

(58) Field of Classification Search
None
See application file for complete search history.

(56) References Cited

U.S. PATENT DOCUMENTS 10,942,170 B2* 3/2021 Tan ..................... G01N 15/1433
2022/0328188 A1* 10/2022 Sanchez ................. G16H 50/20

FOREIGN PATENT DOCUMENTS

WO 2019068073 A1 4/2019

OTHER PUBLICATIONS

Chavez Badiola, A., PCT/MX2019/000144, International Search Report, Aug. 18, 2020, 10 pages.
(Continued)

*Primary Examiner* — Darryl V Dottin
(74) *Attorney, Agent, or Firm* — Miller Johnson

(57) ABSTRACT

The invention relates to a method that allows a set of embryos to be ranked on the basis of ploidy potential and/or pregnancy generation potential, to aid the process of selecting embryos for transfer in an in-vitro fertilisation procedure. The method measures properties or characteristics of the entire blastocyst; extracts characteristics by identifying different cell types, mainly blastocyst structures and patterns, without extracting characteristics of the first cell divisions and the behaviour thereof over time; and predicts the prognosis of pregnancy and/or ploidy (result of genetic study and successful implantation), using micrographs standardised for the management thereof and by means of sequential preprocessing and machine learning algorithms implemented in a computer in order to rank the potential of a set of embryos, to obtain a successful, live, full-term pregnancy.

10 Claims, 5 Drawing Sheets

(56) References Cited

OTHER PUBLICATIONS

Chavez Badiola, A., PCT/MX2019/000144, Written Opinion, Aug. 18, 2020, 29 pages.
Filho, E., et al., "A Review on Automatic Analysis of Human Embryo Microscope Images," The Open Biomedical Engineering Journal, vol. 4, Oct. 11, 2010, pp. 170-177.
Karlsson, A., et al., "Automatic segmentation of zona pellucida in HMC images of human embryos," Proceedings of the 17th International Conference on Pattern Recognition, 2004. ICPR 2004, Aug. 26, 2004, Cambridge, UK, 4 pages.
Wikipedia, "Image segmentation," https://en.wikipedia.org/wiki/Image_segmentation, Retrieved Jun. 17, 2022, 22 pages.
Wikipedia, "Artificial neural network," https://en.wikipedia.org/wiki/Artificial_neural_network, Retrieved Jun. 17, 2022, 29 pages.
Wikipedia, "Image texture," https://en.wikipedia.org/wiki/Image_texture, Retrieved Jun. 17, 2022, 5 pages.

\* cited by examiner

A. Standardized embryo image registration
B. Preprocessing and image enhancement
C. Texture extraction
D. Image segmentation

METHOD BASED ON IMAGE CONDITIONING AND PREPROCESSING FOR HUMAN EMBRYO CLASSIFICATION

FIELD OF THE INVENTION

This invention relates to the determination of a ranking for a set of embryos based on the prognosis of embryonic development from a series of embryo micrographs. The images are conditioned and preprocessed through computer vision techniques and/or classifiers and/or regressors, which may be based on artificial intelligence, to identify features and/or predictors and associate them with a probability indicator. This probability indicator establishes a ranking of the human embryos to identify the one with the highest probability of being viable (ideally to be transferred or stored) for it to be subsequently transferred until a successful embryo product is obtained; therefore, it is considered a biotechnological invention.

BACKGROUND

In state of the art, inventive developments have been made to produce a safe method for obtaining results to combat infertility or to try to avoid multiple pregnancies caused by in-vitro fertilization methods. With the development of imaging different methods have used images as a method of predicting the viability of embryos and their study with the purpose of implanting the most viable of a group of embryos, in other words, the one with the best chance of developing pregnancy and obtaining a viable and healthy gestation.

Some methods have used high-quality time-lapse imaging to analyze different parts of the embryos, usually to monitor the development of human embryos after intracytoplasmic sperm injection (ICSI). Despite existing methods, some correlate blastocyst formation parameters to pregnancy outcomes. Other methods have analyzed the onset of the first division as an indicator to predict the viability of human embryos. Regarding these type of technologies, we can find patent WO2014134550A1, which provides apparatuses, methods, and systems for automated cell classification, embryo ranking and/or embryo categorization. In one implementation, an apparatus includes a classification module configured to determine classifiers to images of one to more cells to determine, for each image, a classification probability associated with each classifier.

Which claims as its principal method an automated cell classification method, comprising:
  a. a plurality of first classifications for each of a plurality of images of one or more cells to determine, for each image, a first classification probability associated with each first classification, wherein:
    each first classification is associated with a first distinct number of cells and determines the first classification probability for each image based on a plurality of cell features that include one or more machine-learned cell features; and
    the first probability of classification indicates a first estimated likelihood that the first distinct number of cells associated with each first classifier is shown in each image, and each of the plurality of images thereby has a plurality of the first classification probabilities associated therewith; and
  classifying each image as showing a second number of cells based on the distinct first number of cells associated with each first classifier and the plurality of first classification probabilities associated with it.

Each classifier is associated with a distinct first number of cells and is designed to determine the classification probability of each image based on cell characteristics, including one or more machine-learned cell features. The classification probability indicates an estimated probability that the first distinct number of cells will be displayed in each image. Therefore, each of the images has classification probabilities associated.

This method does not reveal the anticipated handling of the images since it is apparent from its description that in one embodiment, it presents a method for automated classification that includes applying a plurality of first classifiers to each of a plurality of images of one or more cells to determine, for each image, a first classification probability associated with each first classifier; without disclosing the standardization of the images as an element of image viability, meaning that it only takes images and starts assigning the first classifiers: then to each first classifier it associates a first distinct number of cells. The classifier determines the first classification probability for each image based on a plurality of cell features that include one or more machine-learned cell features. The first classification probability indicates a first estimated probability that the first distinct number of cells associated with each first classifier will be displayed in each image. Each of the plurality of images has a plurality of the first classification probabilities associated therewith; this situation, although it is feasible, could increase its success if prior to the assignment of classifiers, a standardization of the plurality of images of isolated embryos is carried out instead of assigning the initial classifiers, and a set of data is obtained based on an independent set of images of each embryo, which subsequently define their attributes through learning algorithms that allow generating a single unrepeatable record that is classified by the different sectors of the embryo.

Another patent is WO2016001754A2 which is called methods for three-dimensional reconstruction and determining the quality of an embryo, which specifically relates to methods and devices for determining the quality of an embryo. More specifically, this invention relates to the use of three-dimensional reconstructions to determine the quality of an embryo; its principal claim is an in vitro non-invasive method to determine the quality of an embryo comprising the following steps
  a. providing serially image sections of human embryo,
  b. performing a three-dimensional reconstruction of the human embryo, and
  c. determining embryo morphology, fragmentation repartition, blastomeres cleavage axis and/or cell repartition on said three-dimensional reconstruction.

It first determines embryo morphology, fragmentation repartition, blastomeres cleavage axis, and/or cell repartition in a three-dimensional reconstruction in order to compare these parameters that define the identity of a competent or non-competent embryo according to the same criteria; either by the quality of the embryo and it has variants such as serial image sections of the embryo, and it determines the number of blastomeres, the regularity and the fragmentation rate in a way that allows distinguishing if it has 6 to 8 blastomeres, blastomeres of regular size and low fragmentation rate (equal or less than 25%) and concluding that below these parameters the embryo is not competent.

Therefore, the handling of the images represents an inventive effort to reconstruct 3D human oocytes and embryos from serial image sections to improve the assessment of morphology at different stages of in vitro development.

The method is based on the following steps:
a. determining the position of the pronucleus in the oocyte, the morphology of the embryo, the fragmentation repartition, the blastomeres cleavage axis, and the cell repartition in the 3D reconstruction,
b. comparing the position of the pronucleus in the oocyte, the morphology of the embryo, the fragmentation repartition, the blastomeres cleavage axis, and/or the cell repartition in such 3D reconstruction determined in step i) with a control, and
c. conclude that the oocyte or embryo is competent when the position of the pronucleus in the oocyte, the embryo morphology, the fragmentation repartition, the blastomeres cleavage axis and/or cells repartition in the 3D reconstruction determined at step i) are identical to the same criteria in competent oocyte or embryo, and concluding that the oocyte or embryo is non competent when the position of the pronucleus in the oocyte, the embryo morphology, the fragmentation repartition, blastomeres cleavage axis and/or cell repartition in the 3D reconstruction determined in step i) are identical criteria in non-competent oocytes or non-competent embryos. In one embodiment, the control is a competent oocyte or a competent embryo. In another embodiment, the control is a non-competent oocyte or a non-competent embryo.

As it can be seen, a plurality of images are indeed used and compared. However, indiscriminately, which could represent a set of micro-errors (inaccuracies of the images) due to the lack of standardization of the images from which 3D images are reconstructed and used to determine the quality of the embryo as competent or non-competent.

A third patent is WO2019113643 which discloses systems and methods for estimating embryo viability and provides a set of methods that allows the implementation of the following steps in a computer:
a) receiving video data of a human embryo, video data representing a sequence of images of a human embryo in chronological order:
b) applying at least one three-dimensional (3D) artificial neural network to the video data to determine a viability score for the human embryo, wherein the viability score represents a likelihood that the human embryo will result in a viable embryo or fetus; and
c) providing an output in the form of a score indicating the viability of the embryo.

The use of 3D convolutional neural networks allows the use of algorithms for the assignment of viability scores to determine a probability of a viable fetal heart, biochemical pregnancies, gestational or yolk sacs, time for embryo transfer and ultimately a live birth at the end of a pregnancy either from a video or from a plurality of images that are again determined by the quality of the video and consequently of the images representing the frames of said video since as claimed it also processes the video data by adding a visual overlay to at least some images of the video data, the visual overlay indicates contributions of respective portions of the images to the viability score; and it outputs the images with the visual overlays.

This procedure of making overlays is imprecise and depends on a completely handmade work that maintains a percentage of error when manipulating video images and not performing a standardization of them before doing its analysis, where such overlays are made by heat maps or by outputs of scores and even by three-dimensional occlusion windows.

RELEVANT REMARKS i) Any method that employs serial imaging can be used as an input for the method included in this invention in such a way that the use of conventional microscopes or cameras to obtain micrographs is convenient as long as such micrographs are obtained with the method described below.
ii) The proposed method in this document is based on the handling of at least a single image per embryo and not on a series of images to perform the assignment of the indexes that define the viability of a set of embryos, their ranking, and the likelihood of obtaining a full-term pregnancy with a live product.
iii) The previous methods are based on the identification and characterization of the totality of the cells by measuring their specific characteristics or properties.
iv) In addition, the aforementioned methods classify according to the potential for development of blastocyst.
v) Existing methods focus on three-day maturing embryos (6-8 cells) and extract characteristics from each of these cells.
vi) The previously described methods are focused on determining the quality of an embryo and estimating its potential to reach the blastocyst stage.

Some of the significant differences with the existing methods is that this method has some technical effects that will be evidenced in the description. Mainly, this method:

Ranks a set of embryos based on their ploidy potential and/or their potential to produce a pregnancy in order to assist in the embryo selection process to transfer them in an in-vitro fertilization procedure.

Measures the properties or characteristics of the entire blastocyst, including zona pellucida, trophectoderm, and inner cell mass.

It extracts characteristics by identifying different cell types, mainly structures and patterns of the blastocyst, without extracting characteristics of the first cell divisions and their behavior over time, that is to say when there is still no cell differentiation identifiable with conventional instruments (microscopes and specialized cameras).

It predicts the prognosis of a pregnancy and/or ploidy (in other words, the result of a genetic study and implantation success).

Embryos are used from day 5 onwards (blastocyst), and the features obtained are based on structures or patterns, which are applied to the whole embryo and are not performed for each type of cell.

Artificial intelligence and computer vision algorithms are used to extract important or predominant features of the embryo (features) and train the model.

OBJECTIVE: To compare different embryos, based on the extracted features, and create a ranking to determine, according to their ploidy and/or implantation potential, which embryo has the highest potential to produce a pregnancy.

DESCRIPTION

The specific features of this innovative method, based on image standardization to classify human embryonic cells, are described in detail below, where the same reference signs are used to indicate the parts and figures shown.

Figure 1:
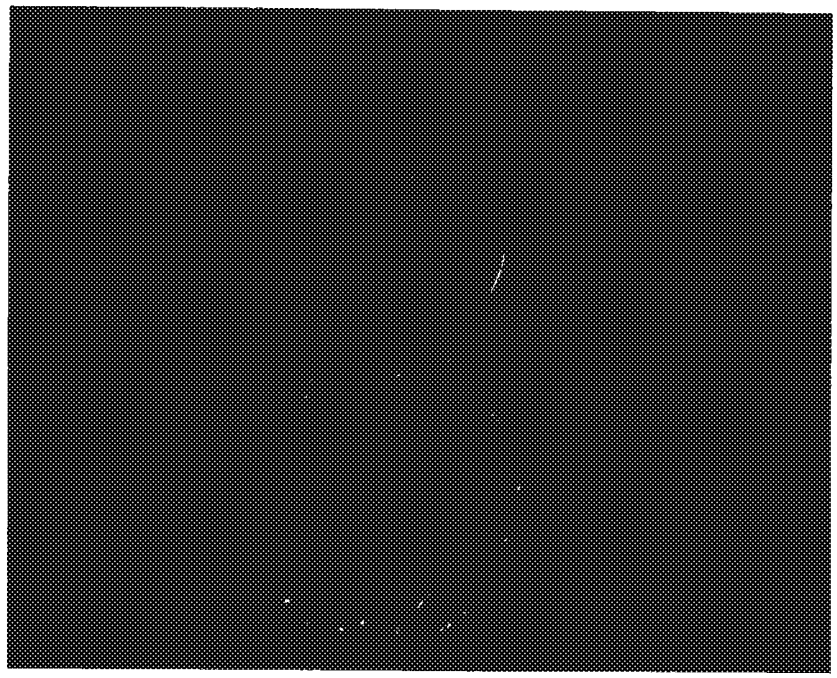
FIG. 1 Electron microscopy view of a first non-standardized image was used as input for the standardized image-based method for human embryo classification.
Figure 2:
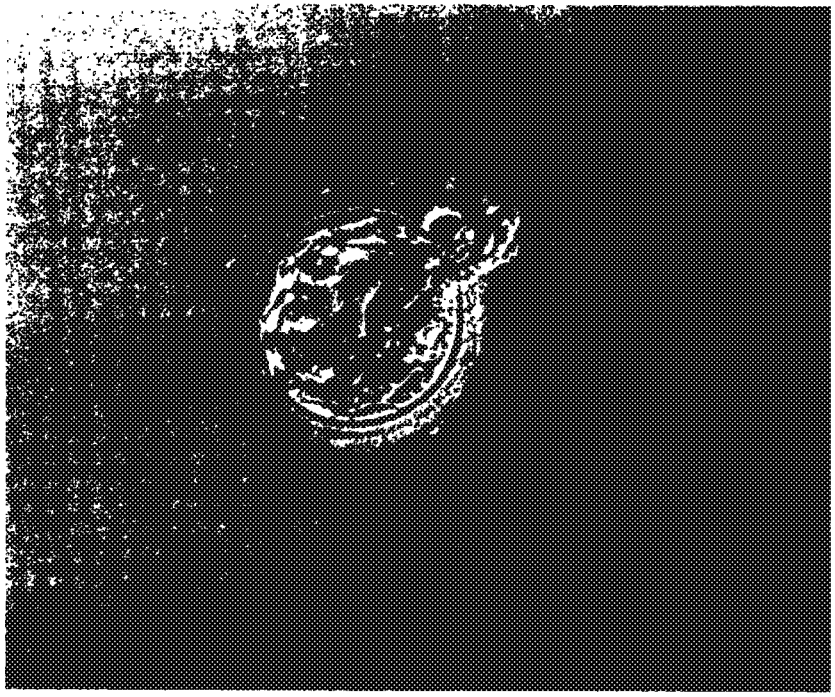
FIG. 2 Electron microscopy view of a second non-standardized image used as input to the image standardization-based method for human embryo classification.
Figure 3:
FIG. 3 Electron microscopy view of a third non-standardized image used as input for the image standardization-based method for human embryo classification.
Figure 4:
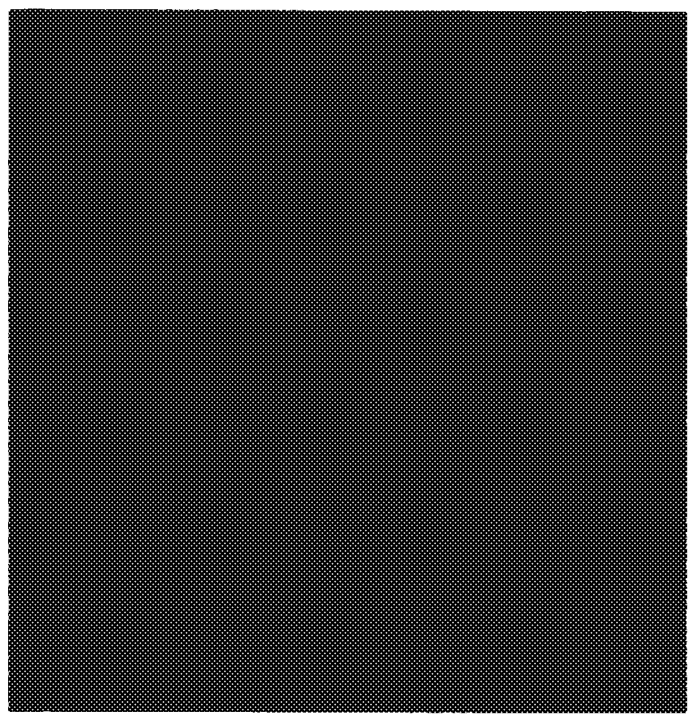
FIG. 4 Electron microscopy view of the first image with a pre-processing and/or conditioning treatment, pre-processed with the standardization parameters used in the image standardization-based method for human embryo classification.
Figure 5:
FIG. 5 Electron microscopy view of the second image with pre-processing and/or conditioning treatment, pre-processed with the standardization parameters used in the image standardization-based method for human embryo classification.

Based on the preceding figures, the method based on image conditioning and pre-processing for human embryo classification has the following stages:

1. OBTAINING INDEPENDENT MICROGRAPHS FROM ONE OR AT LEAST ONE SET OF EMBRYOS: In this stage, a collection of micrographs is made, at least one of them must correspond to a single embryo (if there is a plurality of images, each set of them must be classified independently for each of the embryos). These images can come from the same or different equipment and in the same way, their resolution and magnification can be completely different, therefore, in this stage, they are standardized as follows:
   a. Each image must correspond to a single embryo.
   b. Each image is individually analyzed and handled until the pixel to square micrometer or voxel to cubic micrometer ratio is the same for the whole set of images, using interpolation techniques for this process;
   c. The image of the embryo must correspond to the blastocyst stage, generally between days 5 to 7 after the fertilization day of embryo development. Preferably, each image should be obtained prior to any physical intervention that is intended, such as freezing and/or biopsy;
   d. Images of embryos can be taken in 2, 3, or 4 dimensions (3 spatial and one temporal dimension) with pixel or voxel reconstruction techniques.
   e. If the micrograph is in 2 dimensions, the thickest area of the embryo is identified by defining the size of the longest possible diameter of the embryo as seen in two dimensions; the focal plane should be at the height of the embryo that represents the largest diameter in its 2D representation; it should be obtained manually, moving the vertical position of the focal plane until it is close to the point with the largest diameter, in a way that the trophectoderm is observed as sharp as possible (i.e., that it can be observed in clearly defined edges; to obtain minimum blurring in the image), using a range of light, so that the structures can be sharply observed and a contrast is obtained that allows the sharpness described above;
   g. The embryo must appear complete within the image and without obstructions, that is to say, without objects such as instruments, text added to the image, or superimposed structures, among others;

Thus, at the end of this stage, we have a plurality of independent images (in 2, 3, or 4 dimensions) pre-processed and enhanced (regardless of the source that produces them) with microscopy, high-definition digital cameras, or other specialized techniques for image reconstruction.

This stage is carried out iteratively during the process so that the plurality of images shows the modifications of the embryos during this period;

2. IMAGE PRE-PROCESSING AND ENHANCEMENT. Using a computer, machine vision and/or machine learning strategies are defined until a standardized image of the embryo is obtained; by using deep learning and/or machine learning techniques, relevant characteristics are identified such as the pixel to square micrometer or voxel to cubic micrometer ratio, the intensity distribution of the pixels or voxels, the responses to previously given convolutional filters, or other previously defined mathematical models that allow the identification of intensity patterns in a standardized image of the embryo, or other previously defined mathematical models that allow the identification of intensity patterns in 2, 3 or 4 dimensions such as roughness, contrast, brightness, saturation, smoothness, or particular shapes, for the prediction of embryo characteristics such as degree of collapse, or degradation, as well as the stage of the embryo; said parameters may be based on filters that identify a plurality of textures and/or other metrics based on segmentation of cell types: in which said plurality of textures may be at least one of those where a combination of texture detector masks are used such as 2-dimensional LAWS (Preferably 25, wherein the LAWS energy is obtained by detecting textures in embryo images which may be the standardized, or enhanced through machine vision strategies such as energy filters, Gaussian, Laplacian and edge detectors) to identify textures on the original image and at least one variant of the original. To generate the variants, entropy filters with different radius of influence and Gaussian blur are used; once this activity is completed, the automatic cropping technique is implemented, that is, the calculated textures are used, and the k-means algorithm is used with a k value of at least 2 to identify the pixels that belong to the background from those that belong to the embryo or any instrument or material present in the photograph that is not the embryo. Based on this 2, 3, or 4-dimensional mask, the edges are detected to crop the image containing the embryo. As an alternative to the automatic cropping based on the k-means algorithm, it is also possible to use an artificial intelligence-based object identifier, to identify and subtract from the image instruments, letters, or other artifacts unrelated to the embryo. To identify the stages of embryo development, a deep convolutional neural network model that can classify embryos into one of three stages is used: a) expanding, b) hatching and c) hatched; or it can function as a regressor defining the percentage that is inside the zona pellucida and the percentage that is outside. With the classifier technique, a probability value [0-1] is obtained, and the image corresponds to one of these three classes with an accuracy depending on the model used.

To identify embryos that are collapsed (a natural process of embryos), a previously trained classifier can be used, which is identified with a probability index, or through a regressor that allows the identification of the percentage of collapse shown by the image of the embryo; to identify the degree of degradation of an embryo, one can use a pre-trained classifier that uses a probability index that a given image is in the "degraded' or "normal" class, or a pre-trained regressor that identifies the percentage of degradation of the embryo through the image.

To identify the degree of development of an embryo within a developmental curve, a previously trained classifier can be used, which uses a probability index indicating that a given image falls within one or several classes associated with the degree of evolution or growth of the embryo according to the expected growth given the embryo's conditions; as an alternative to the classifier, a previously trained regressor can be used to identify the percentile in which the embryo is located according to its growth and development, based on healthy embryos, or alternatively, statistical data can be used to locate the image of the embryo within a distribution of statistical parameters of growth such as the size of the different zones of the embryo. Therefore, at the end of this stage, a computer-implemented algorithm is available to identify the pixels or voxels that belong to at least one of the following five areas: i) background, ii) zona pellucida, iii) trophectoderm, iv) blastocele and/or v) inner cell mass; the supervised training is performed through manual labels on the texture vectors for each pixel or voxel; where, from the predictions made at the pixel or voxel level, the predictions are subjected to a process to generate more homogeneous areas for each label, which involves the extraction of the blobs of a k-means (k=20) and a process of erosion and dilation of the zones. An alternative to identify the different zones is to use a neural network model containing an encoder and a decoder that associates each pixel or voxel to one of five labels: i) background, ii) zona pellucida, iii) trophectoderm, iv) blastocele and/or v) inner cell mass;

3. ASSIGNING FEASIBILITY POTENTIAL. With the algorithm of the previous stage, in addition to the descriptors related to the collapse and degradation phases, other descriptors based on the following are obtained: original image, image with entropy filters, image with highlighted edges, polar image from a centroid, and the areas identified by the segmentation methodology. Statistical descriptors are used, or a fraction of them selected by descriptor selection methods, associated with the distribution of the data, including but not limited to measures of central tendency, dispersion, and kurtosis; so that with the list of descriptors obtained from each egg, together with the history of the patient (age and hours between fertilization and the image or images), and the source of the egg (laboratory preset: microscope, and objective), a deep neural network is trained to classify each embryo into one of two classes: good prognosis and poor prognosis. Alternatively, another classification algorithm such as support vector machines, decision trees, or other algorithm can be used. Understanding good prognosis as a euploid and/or transferred embryo with (beta-human chorionic gonadotropin) b-hCG>=20 units (beta positive, pregnancy, 7 days after transfer) and/or presence of gestational sac at least three weeks after transfer, observed by imaging techniques and/or presence of heartbeat at least five weeks after transfer and/or evidence of live birth; and one with a poor prognosis as an aneuploid or b-hCG value<20 and/or miscarriage after embryo implantation.

If there is a conflict in the criteria used to classify embryo images (for example euploid with b-hCG<20), priority is given to the ploidy level of the embryo;

Finally, a set of embryos is ranked in descending (or ascending) order according to the probability of having a good prognosis; in such a way that the health care team evaluates the results obtained by the algorithm, together with the patient's history and decides which embryos will be transferred, depending on the case.

To evidence the inventive activity in this document, some examples that evidence the preceding industrial method are presented below.

EXAMPLE 1. Using a conventional computer system, the process begins with the evaluation of conventional (early) images of an embryo at its blastocyst stage (between the 5th and 7th day of embryo development after the day of fertilization), which were obtained from a patient whose eggs have not been intervened whether physically and/or biopsied; with these characteristics we start with stage A of the method based on image conditioning and pre-processing for human embryo classification where a collection of micrographs of a single embryo, in this case from the same equipment, already have the same resolution in such a way that the conditioning and pre-processing is a minimal manipulation stage since the images correspond to a single embryo but are nevertheless manipulated only to obtain the size of each pixel or voxel for them to be homogeneous throughout the series of images, using interpolation techniques; once the thickest area of the embryo is identified in two dimensions; the images are positioned in such a way that the area of focus of the microscope is in the area of greatest diameter of the embryo; the focal plane is at the height of the embryo that represents the greatest diameter in its 2D representation; it is important that the trophectoderm is observed as sharp as possible (i.e., that it can be observed in clearly defined borders); leaving the whole embryo within the image and without obstructions; the intervention then proceeds to the pre-processing and/or image enhancement stage B, where artificial vision and/or automatic learning strategies are used until a standardized image of the embryo is obtained; based on filters to identify a plurality of B1 textures and/or other metrics based on the segmentation of cell types; after this activity, the automatic cropping technique is implemented; in this case, 275 calculated textures are shown, and the k-means algorithm is used with a k=2 to identify the pixels or voxels that belong to the "background" from those that belong to the embryo. Based on this mask, edges are detected to cut out the image B2 containing the embryo; feature extraction is performed using computer vision and/or artificial intelligence, where a deep convolutional neural network model B3 is used to identify embryos in one of three phases: a) expanding, b) hatching and c) hatched. With this technique, a probability value [0-1] is obtained where an image corresponds to one of these three classes with an accuracy of 95%. In addition, this same model identifies embryos that are collapsed (a natural process of embryos), which is also identified with a probability factor that allows separating at least three models independently: a) developmental stages; b) collapsed embryos; and c) degraded embryos; once the previous stage is completed, other descriptors are obtained from the B3 descriptors related to the phases, collapse and degradation, based on the following: original image, image with entropy filters, edge detection with "canny" algorithm, polar image from a centroid, and the areas identified by the segmentation methodology to use these descriptors associated with the distribution of data such as measures of central tendency, dispersion, kurtosis, among others, and with this the set of C embryos is ranked in descending order according to their probability of having a good prognosis; in such a way that the healthcare team evaluates, on a case by case basis, the results obtained by the algorithm, along with the patient's history and decides which embryos will be transferred.

EXAMPLE 2. A comparison was made by a team of embryologists through a case study between the embryo selection process in a conventional way and the selection process proposed for registration. The starting point was the particular case of a treatment in which five blastocysts were obtained from the embryo selection process.

For this case, the genetic study was used as the gold standard, where a euploid result is considered a good prognostic result and an aneuploid result a poor prognostic result. In addition, the level of b-hCG (beta-human chorionic gonadotropin) in serum seven days after embryo transfer was used as a reference.

Embryo Selection by Conventional Methods

Based on the achievement of five blastocyst stage embryos, the embryology team grades each embryo based on four characteristics: (i) the day on which the embryo matured to the blastocyst stage (commonly day five or day six), (ii) the size of the blastocyst (using a scale of 1 to 5 where 1 is the smallest and 5 is the largest), iii) the quality of the inner cell mass (measured on a scale of 1 to 3, where 1 is the best quality and 3 is the lowest quality), and iv) the size and shape of the cells in the trophectoderm (measured on a scale of 1 to 3, where 1 is the best quality and 3 is the lowest quality). The results of the evaluation can be seen in Table 1:

TABLE 1

Evaluation results

| Embryo | Day in which the embryo matured to the blastocyst stage | Size | Quality of the inner cell mass | Trophectoderm quality |
|---|---|---|---|---|
| 1 | 6 | 5 | 1 | 1 |
| 2 | 5 | 5 | 1 | 1 |
| 3 | 5 | 5 | 2 | 2 |
| 4 | 5 | 5 | 2 | 1 |
| 5 | 6 | 5 | 1 | 1 |

Based on these features, the embryology team chose embryo 2 as the most suitable embryo to perform the transfer, even without knowing the ploidy status of the embryos.

Embryo Selection Using the System

The following procedure was applied for each of the five images.

Figure 6:
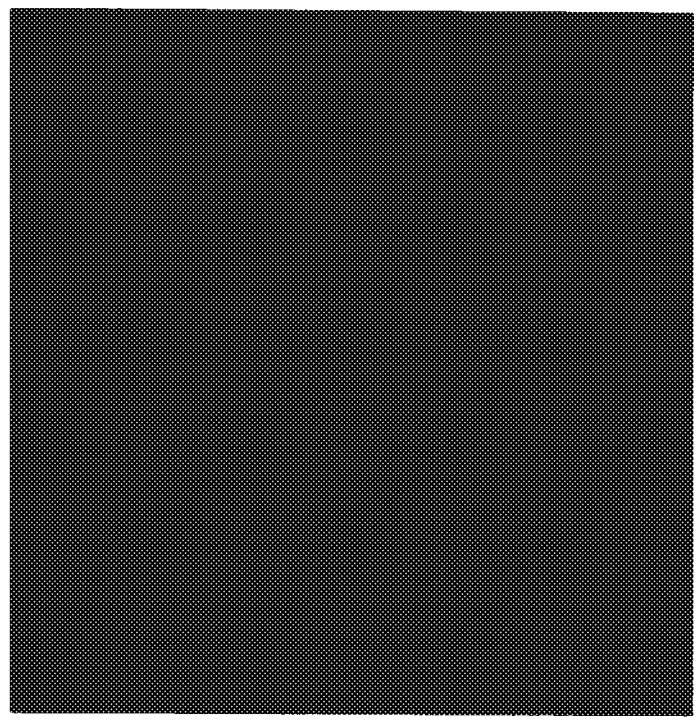
FIG. 6 Electron microscopy view of the third image with pre-processing and/or conditioning treatment, pre-processed with the standardization parameters used in the image standardization-based method for human embryo classification.

Although the images were taken with similar microscope, light, and optical filters characteristics, as shown in FIG. 6, they were taken with different objectives (200× and 400×), resulting in a heterogeneous ratio of micrometers per pixel (embryos 2 and 5 at 400×, and the rest at 200×).

Figure 7:
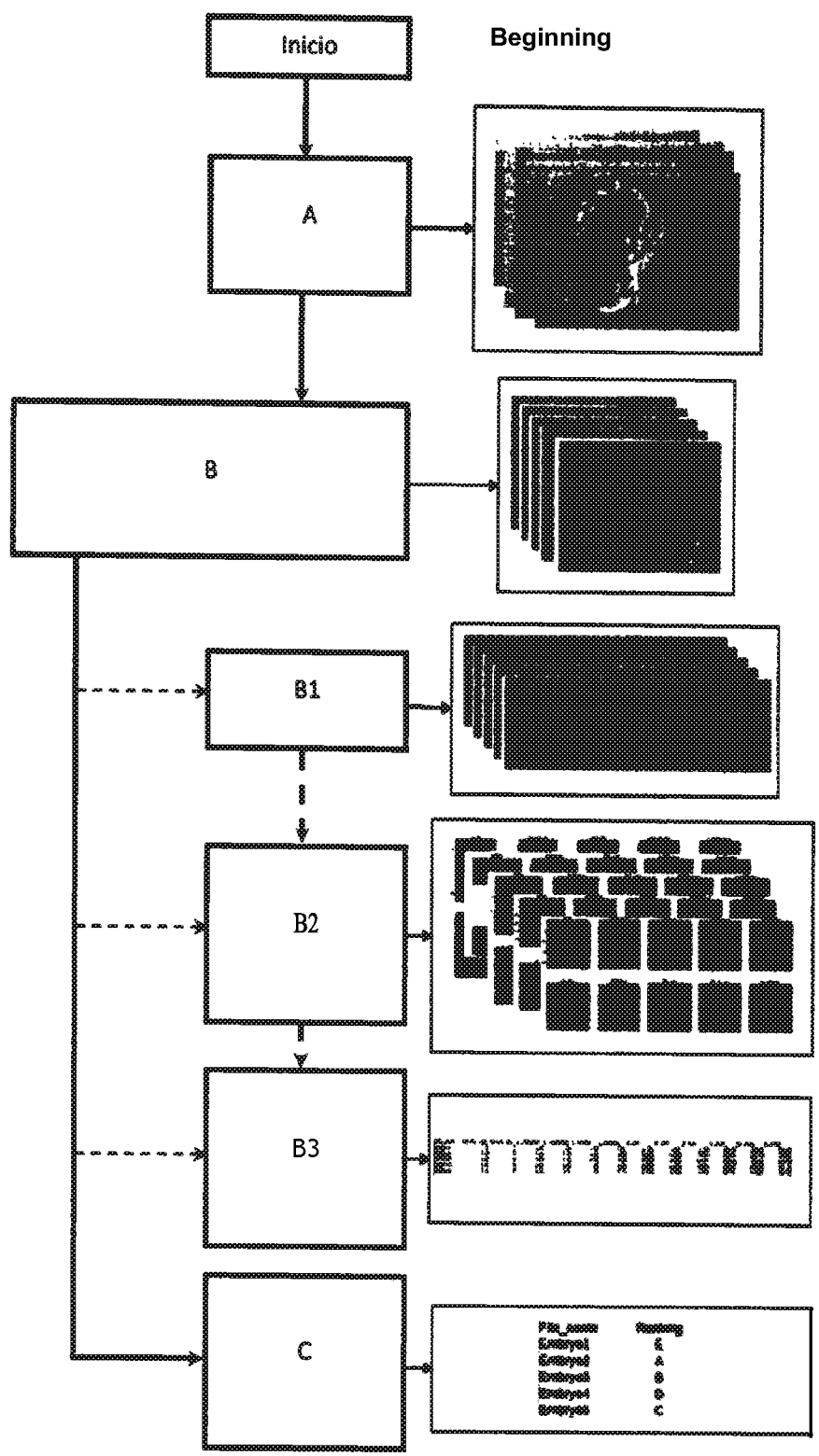
FIG. 7 A view of the elements that comprise Example 1 with the steps of the method based on image conditioning and pre-processing for human embryo classification.
Figure 8:
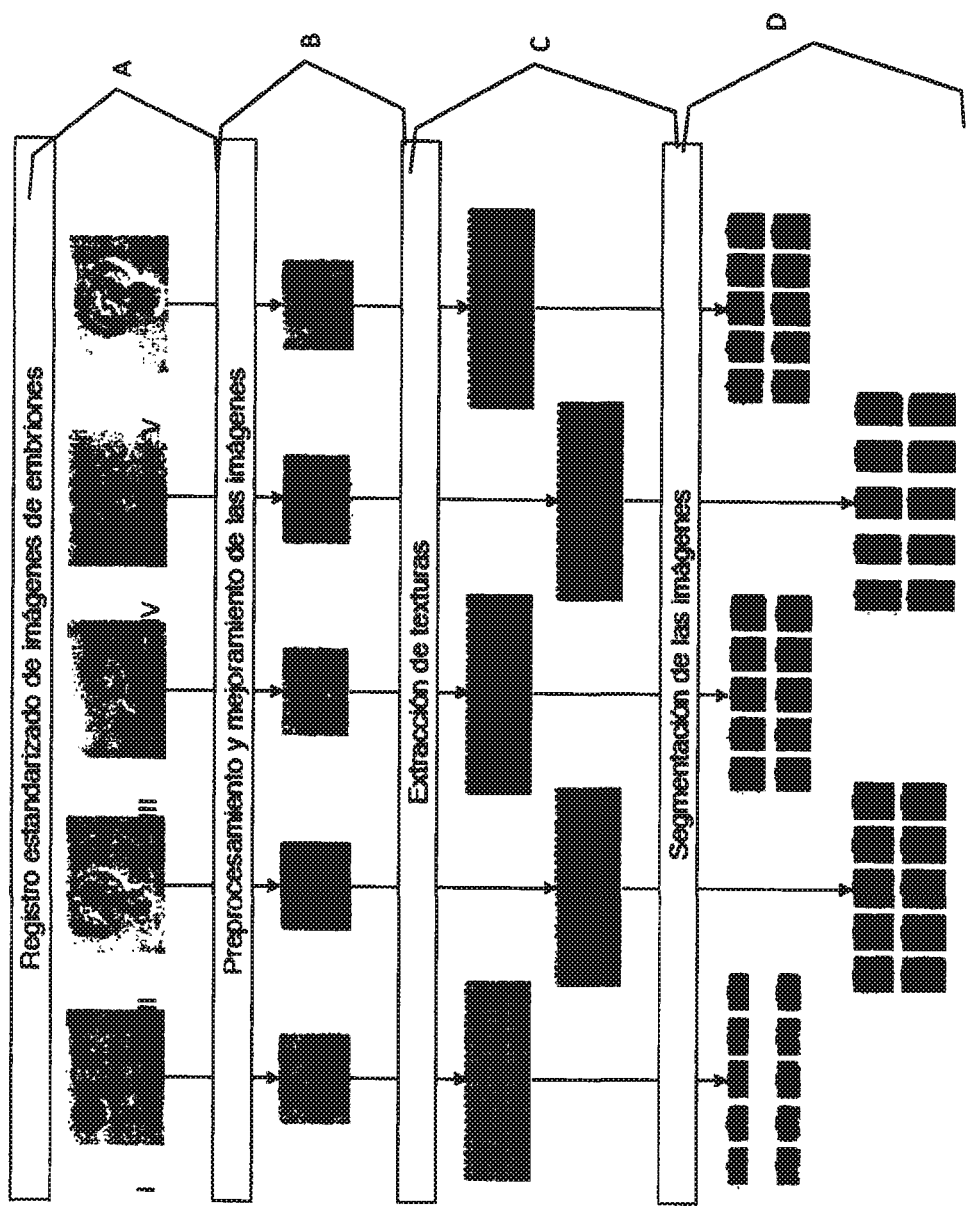

The first step of the proposed registration system was the pre-processing and enhancement of the image, which resulted in the homogenization of the micrometer to pixel ratio. In this case, it has been adjusted to one micrometer per pixel. In addition, the pre-processing identifies the embryo and crops it out of the image. Then a filling pattern is performed to homogenize the size of the images by copying the values of the image border. It has been adjusted to 400×400 pixels, as shown in FIG. 7. The pre-processed images are introduced to a neural network model previously trained to identify the phase of each of the embryos and their collapse. This results in the correct identification of the phase of each embryo, as shown in Table 2.

TABLE 2

Pre-processed and evaluated embryo images.

| Embryo | Expansion | Hatched | Hatching | Collapsing |
|---|---|---|---|---|
| 1 | <0.01 | <0.01 | 0.96 | 0.03 |
| 2 | 0.10 | <0.01 | 0.81 | 0.09 |
| 3 | <0.01 | <0.01 | 0.99 | <0.01 |
| 4 | <0.01 | <0.01 | 0.99 | <0.01 |
| 5 | <0.01 | <0.01 | 0.74 | 0.25 |

Then, the system proceeds to the identification of 275 textures for each pre-processed image, using the 25 Laws' (5×5) masks. The Laws' masks are obtained by calculating the product (vertical×horizontal) of all the combinations between the following vectors: i) 1, 4, 6, 4, 1, ii) −1, −2, 0, 2, 1, iii) −1, 0, 2, 0, −1, iv) 1, −4, 6, −4, 1, and v) −1, 2, 0, −2, 1. Some filters have been applied before applying the convolution of Laws' masks, with the intention of highlighting characteristics or patterns in the images, which consist of the application of entropy filters with a radius between 2 and 20 pixels, as well as square Gaussian filters ranging in size from 5 to 11 pixels. This process then creates a vector of 275 characteristics for each pixel. All of these vectors are fed into a neural network model previously trained to classify these pixels into one of four categories: i) background, ii) zona pellucida, iii) trophectoderm, and iv) inner region. With this information, a binary image is reconstructed for each of the four categories.

These vectors were then used for unsupervised classification into 20 groups using the k-means algorithm. Then, for each group of pixels belonging to the same group identified by k-means that are contiguous in the image, the predominant category (background, zona pellucida, trophectoderm, or inner region) was identified and homogenized among all pixels in that group. Four binary masks were created corresponding to each of these four categories (background, zona pellucida, trophectoderm or inner region) with this information. The zona pellucida mask was subsequently treated with two dilations, five erosions, and three dilations with a 3×3 size in each case.

We then proceeded to the extraction stage of the characteristics. This consists in the computation of statistical descriptors for pixels belonging to the i) whole embryo, ii) zona pellucida, iii) trophectoderm and iv) inner region. Parameters associated with the distribution of the data such as mean, variance, coefficient of variation, range, and percentiles, among others, were used, resulting in a total of 81 parameters.

The proposed system then uses the previously described list of characteristics and feeds them into a previously trained AI model to predict the prognosis of each embryo. This resulted in a list of probability values that each list of characteristics associated with each embryo image belongs to the good prognosis class. The embryos are ranked in descending order according to their probability value of belonging to the good prognosis class using letters of the alphabet in order, therefore the letter 'A' is assigned to the embryo with the best prognosis. The results of the ranking are shown in Table 3 below.

TABLE 3

Results of the ranking of the embryos.

| Embryo | Probability of belonging to the good prognosis class | Ranking |
|---|---|---|
| 1 | 0.86 | D |
| 2 | 0.28 | E |
| 3 | 0.97 | A |
| 4 | 0.93 | C |
| 5 | 0.94 | B |

This resulted in the selection of embryo 3 as the one with the best prognosis, followed by 5, 4, 1 and 2 in that order. This means that embryo 2 was assigned the worst prognosis.

Afterwards, the genetic study results with the embryos selected by the embryology team were compared with those of the system (which had been blind so far for both the embryology team and the system being proposed here). The results of the genetic study are shown in Table 4 below.

TABLE 4

Results of the genetic study are shown in Table 4 below.

| Embryo | Ploidy | Genus |
|---|---|---|
| 1 | Euploid | Male |
| 2 | Aneuploid | — |
| 3 | Euploid | Female |
| 4 | Euploid | Female |
| 5 | Euploid | Male |

The genetic results showed that embryo 2 was the only aneuploid, indicating that, if the embryo had been selected using the criteria of the embryology team, the aneuploid would have been selected, and the procedure would have been unsuccessful. On the other hand, the system identified embryo 2 as the embryo with the lowest probability of having a good prognosis.

The patient decided to have embryo 5 transferred based on the gender and the result of the genetic study.

Follow-Up

Embryo 5 was transferred without any risk factor. Seven days after the transfer, a blood sample was taken, and b-hCG was measured with a value of 110 mIU/ml. A second b-hCG sample was taken two days later in reference to the last one, where a value of 275 mIU/ml was obtained. This is interpreted as a healthy pregnancy.

26 days after the transfer of embryo 5, a routine ultrasound was performed, where structures (yolk sac and embryo) of the expected size were observed, which indicates a normal development of the pregnancy.

EXAMPLE 3. This example shows how the process is viable for the ranking of other types of cells (egg cells); where the method allows identifying different characteristics present in cellular structures and their selection and ranking; next, the method is performed with eggs to show the industrial application and inventive activity of the process.

1. OBTAINING INDEPENDENT MICROGRAPHS FROM ONE OR AT LEAST ONE SET OF EGG CELLS: In this stage, a collection of micrographs is made, at least one of them must correspond to a single egg cell (in case of a plurality of images, each set of them must be classified independently for each of the eggs). These images can come from the same or different equipment, and in the same way, their resolution and magnification can be completely different, therefore, in this stage, they are standardized as follows:
    a. Each image must correspond to a single egg cell.
    b. Each image is individually analyzed and handled until the pixel to square micrometer or voxel to cubic micrometer ratio is the same for the entire set of images, using interpolation techniques for this process;
    c. The image of the egg should correspond to a mature egg, preferably each image should be obtained before any physical intervention such as freezing;
    d. Images of the eggs can be taken in 2, 3, or 4 dimensions (3 spatial and 1 temporal dimension) with pixel or voxel reconstruction techniques.
    e. If the micrograph is in 2 dimensions, the thickest area of the egg cell is identified by defining the size of the largest possible diameter of the egg cell seen in two dimensions; the focus area of the microscope is located in the area of the largest diameter of the egg cell; the focal piano is at the height of the egg representing the largest diameter in its 2D representation; it should be obtained manually, moving the vertical position of the focal plane until it is close to the point with the largest diameter, in a way that the cell membrane and the zona pellucida are observed as sharp as possible (i.e., that it can be observed in clearly defined edges; to minimum blurring in the image), using a range of light, so that the structures can be sharply observed and a contrast that allows the sharpness described above is obtained.
    f. The egg must be completely shown inside the image without obstructions. In other words, no objects such as instruments, text added to the image, and superimposed structures, among others, must appear in the image;
    Thus, at the end of this stage, a plurality of independent images (in 2, 3, or 4 dimensions) are available, preprocessed, and enhanced (regardless of the source that produces them) with microscopy, high-definition digital cameras, or other specialized techniques for image reconstruction. This stage of the process is carried out iteratively during the process so that the plurality of images shows the modifications of the eggs during this period;
2. IMAGE PRE-PROCESSING AND ENHANCEMENT. Using a computer, the artificial vision and/or machine learning strategies are defined until a standardized image of the egg is obtained; by using deep learning and/or machine vision techniques, relevant features such as pixel to square micrometer or voxel to cubic micrometer ratios, pixel to voxel intensity distributions, responses to previously given convolutional filters, or other previously defined mathematical models that allow the identification of intensity patterns in 2, 3 or 4 dimensions are identified, such as roughness, contrast, brightness, saturation, smoothness, or particular shapes, for the prediction of egg characteristics such as internal diameter, thickness of the zona pellucida, granularity, presence of vacuoles, presence and position of the meiotic spindle, among others; said parameters may be based on filters to identify a plurality of textures and/or other metrics based on the segmentation of structures: in which said plurality of textures may be at least one of those where a combination of texture detector masks are used such as LAWS' (Preferably 25, wherein the LAWS' energy is obtained by detecting textures in images of the egg which may be standardized or enhanced through machine vision strategies such as energy filters, Gaussian, Laplacian, and edge detectors) to identify textures over the original image and at least one variant of the original. To generate the variants, entropy filters with different radius of influence and Gaussian blur are used; once this activity is completed, the automatic cropping technique is implemented, that is, the calculated textures are used, and the k-means algorithm is used with a k value of at least 2 to identify the pixels that belong to the background from those that belong to the egg or some instrument or material present in the photograph different from the egg. Based on this mask, the edges are detected to crop the image containing the egg. As an alternative to the automatic cropping based on the k-means algorithm, it is also possible to use an artificial intelligence-based object identifier, to identify and subtract from the image instruments, letters, or other artifacts unrelated to the egg. To identify the stages of egg development, a deep convolutional neural network model is used, which can classify eggs into one of the following stages: a) presence of germinal vesicle, b) meiosis I, to c) meiosis II; with the classifier technique, a probability value [0-1] is obtained, and the image corresponds to one of these three classes with an accuracy depending on the model used.

A previously trained classifier can be used to identify the position of the polar body, which is identified with a probability index.

To identify the degree of degradation of an egg cell, a previously trained classifier that uses a probability index within "degraded" to 'normal" can be used, or a previously trained regressor that identifies the percentage of degradation that the egg presents in the image.

To identify the degree of development of an egg cell within a developmental curve, a previously trained classifier can be used, which uses a probability index indicating that a given image falls within one or several classes associated with the degree of evolution of the egg growth according to the expected growth given the conditions of the ovum; as an alternative to the classifier, a previously trained regressor can be used to identify the percentile in which the egg is located according to its growth and development, based on healthy eggs, or alternatively, statistical data can be used to locate the image of the egg within a distribution of statistical parameters of growth such as the size of the different zones.

Thus, at the end of this stage, we have a computer-implemented algorithm that allows us to identify the pixels or voxels that belong to different structures.

The supervised training is performed through manual labels on the texture vectors for each pixel or voxel; where, from the predictions made at the pixel or voxel level, the predictions are subjected to a process to generate more homogeneous areas for each label, which involves the extraction of the blobs of a k-means and a process of erosion and dilation of the regions.

An alternative to identify the different areas is to use a neural network model containing an encoder and a decoder that associates each pixel or voxel to one of the structures of interest.

3. ASSIGNING FEASIBILITY POTENTIAL. With the algorithm of the previous stage, in addition to the descriptors related to the maturation and degradation phases, other descriptors based on the following are obtained: original image, image with entropy filters, image with highlighted edges, polar image from a centroid, and the areas identified by the segmentation methodology. Statistical descriptors are used, or a fraction of them, selected by descriptor selection methods, associated with the distribution of the data, including but not limited to measures of central tendency, dispersion, and kurtosis; so that with the list of descriptors obtained from each egg, together with the history of the patient (age and hours between fertilization and the image or images), and the source of the egg (laboratory preset: microscope, and objective), a deep neural network is trained to classify each embryo into one of two classes: good prognosis and poor prognosis. Alternatively, another classification algorithm such as support vector machines, decision trees, or some other algorithm can be used. Understanding good prognosis as an egg that successfully achieved fertilization, or that developed into a euploid embryo and/or transferred with (beta-human chorionic gonadotropin) b-hCG>=20 units (beta positive, pregnancy, 7 days after transfer) and/or presence of gestational sac at least three weeks after transfer, observed by imaging techniques and/or presence of heartbeat at least five weeks after transfer and/or evidence of live birth; and one with a poor prognosis such as an egg that did not mature at the meiosis I to meiosis II stage and did not achieve normal fertilization, or one that generated an aneuploid embryo with b-hCG value <20 and/or miscarriage after the embryo implantation.

Finally, there a set of eggs is ranked in descending (or ascending) order according to the probability of having a good prognosis; and the health care team evaluates the results obtained by the algorithm, together with the patient's history, which shall help in subsequent decision making.

Having described my invention, which I consider to be a novelty, I claim as my exclusive property the contents of the following claims:

1. A non-invasive method to be used in a computer device to determine the automatic evaluation of human embryonic cells, using rankings and computer-implemented algorithms to assign attributes, characterized by:

A. obtaining from one or a different set of electronic equipment, a set of independent micrographs that can have different resolutions, where the focus and focal adjustment must be obtained in the largest diameter of the blastocyst (including micrographs of representation in 2D, 3D or 4D indistinctly) of at least one set of embryos;

B. pre-processing and conditioning the images, providing a set of pre-processed images, which includes images filtered by machine vision kernels (including the egg itself) as texture identifiers which are designed a priori or in an iterative process of adjustment, to a neural network to be compared with standardized patterns in order to determine a ranking among the set of embryos;

C. assigning the viability potential that influences the achievement of a successful pregnancy using convolutional networks (first classifier) as a descriptor extractor, and then submit these descriptors to a secondary artificial intelligence classifier (which may be different from a neural network) that uses the descriptors to create the prognostic model to obtain the viability of implantation of a ranked embryo; and D. transferring embryo(s) based on the ranking of the embryo(s) with the best chance of producing a successful pregnancy and live birth, wherein the stage of obtaining independent micrographs of at least one set of embryos is characterized because in this stage a collection of micrographs is made, and at least one of them corresponds to a single embryo (if there is a plurality of images, each set of images is classified for each of the embryos independently), these images can come from the same or from different equipment and in the same way their resolution and magnification can be completely different, so that at this stage a standardization of them is performed as follows:

a. each image corresponds to a single embryo;
b. each image is individually analyzed and manipulated until the pixel-to-micrometer ratio is the same for the entire set of images, using interpolation techniques for this process;
c. the image of the embryo corresponds to the blastocyst stage, generally between days 5 and 7 after the day of fertilization of the embryo development; wherein each image is obtained prior to any physical intervention such as freezing and/or biopsy that is intended to be performed on the embryo;
d. the thickest area of the embryo is identified by defining the size of the largest possible diameter of the embryo as seen in two dimensions; the focus area of the microscope is in the area of the largest diameter of the embryo; the focal plane is at the height of the embryo representing the largest diameter in its 2D representation; the focal plane is obtained manually, moving the vertical position of the focal plane until it is close to the point of greatest diameter, so that the trophectoderm is observed as sharply as possible (meaning that it can be observed in clearly defined borders; to obtain the least amount of blurring in the image), using a range of light, in a way that the structures can be clearly observed and a contrast that allows the sharpness described above is obtained; and
e. the embryo appears complete within the image without obstructions, such that no objects, including instruments, text added to the image, and superimposed structures, appear in the image;

wherein in addition, where the pre-processing and image enhancement stage is performed using a computer, machine vision and/or machine learning strategies are defined until a standardized image of the embryo is obtained; by using deep learning and/or machine vision techniques, relevant features including pixel to micrometer ratio, pixel intensity distribution, responses to previously given convolutional filters, or other previously defined mathematical models are identified to allow the identification of 2-D intensity patterns including roughness, contrast, brightness, saturation, smoothness, or shapes for the prediction of embryonic characteristics including degree of collapse, or degradation, as well as the stage of the embryo; said parameters are based on filters that identify a plurality of textures and/or other metrics based on segmentation of cell types: in which said plurality of textures are at least one of those where a combination of texture detector masks are used in 2-dimensional LAWS (25, wherein the LAWS energy is obtained by detecting textures in embryo images which are the standardized, or enhanced through machine vision strategies including energy filters, Gaussian, Laplacian and edge detectors) to identify textures on the original image and at least one variant of the original, wherein to generate the variants, entropy filters with different radius of influence and Gaussian blur are used; once this activity is completed, the automatic cropping technique is implemented by using the calculated textures with the k-means algorithm or artificial intelligence-based object identifier, and the k-means algorithm is used with a k value of at least 2 to identify the pixels that belong to the background from those that belong to the embryo or any instrument or material present in the photograph different from the embryo, wherein based on this mask, the edges to crop the image containing the embryo are detected, wherein the artificial intelligence-based object identifier allows the identification and subtraction of instruments, letters, or other artifacts different from the embryo in the image, wherein to identify the stages of embryo development, a deep convolutional neural network model that can classify embryos into one of three stages is used: a) expanding, b) hatching and c) hatched; or it can function as a regressor by defining the percentage inside the zona pellucida and the percentage outside the zona pellucida, wherein with the classifier technique, a probability value [0-1] is obtained, and the image corresponds to one of these three classes with an accuracy depending on the model used; furthermore, in the stage in which viability potential is assigned, in addition to the descriptors related to the phases, collapse and degradation, other descriptors are obtained based on the following: original image, image with entropy filters, image with highlighted edges, polar image from a centroid, and the areas identified by the segmentation methodology, wherein statistical descriptors are used, or a fraction of them selected by descriptor selection methods, associated to the distribution of the data as measures of central tendency, dispersion, kurtosis; so that with the list of descriptors obtained from each egg, together with the history of the patient (age and hours between fertilization and the image or images), and the source of the egg (laboratory preset: microscope, and objective), a deep neural network is trained to classify each embryo into one of two classes: good prognosis and poor prognosis, wherein alternatively, another classification algorithm such as support vector machines, decision trees, or other algorithm can be used, wherein understanding good prognosis as a euploid and/or transferred embryo with (beta-human chorionic gonadotropin) b-hCG>=20 units (beta positive, pregnancy, 7 days after transfer) and/or presence of gestational sac at least three weeks after transfer, observed by imaging techniques and/or presence of heartbeat at least five weeks after transfer and/or evidence of live birth; and one with a poor prognosis as an aneuploid or b-hCG value<20 and/or miscarriage after embryo implantation, wherein if there is a conflict in the criteria used to classify embryo images (for example euploid with b-hCG<20), priority is given to the ploidy level of the embryo; and finally, a set of embryos is ranked in descending (or ascending) order according to the probability of having a good prognosis; in such a way that the health care team evaluates the results obtained by the algorithm, together with the patient's history and decides which embryos will be transferred, depending on the case.

2. The method of claim 1, is characterized in that it includes a set of comparison patterns of the physiological characteristics of the set of embryos as part of their ranking based on their assigned potential probability and which are compared with the standardized image of the embryo where these patterns and images of the embryos are provided to a neural network.

3. The method of claim 1, is characterized in that the embryo images are evaluated by employing computer vision and/or machine learning strategies wherein relevant characteristics such as pixel to micrometer ratio, pixel intensity distribution and responses to convolutional filters are identified.

4. The method of claim 1, is characterized in that it provides the neural network image, which includes the pre-processed images of the embryo to a discriminative classifier as part of a generative adversarial network that ranks the physical and physiological characteristics of the embryo.

5. The method of claim 1, is characterized in that it provides the set of pre-processed images of the embryo, classified, and ranked into a convolutional network.

6. The method of claim 1, is characterized in that it provides the set of pre-processed images of the embryo, classified, and ranked, to an expert system.

7. The method of claim 6, which provides the set of pre-processed images of the embryo, classified, and ranked to an expert system characterized in that the expert system is a feedforward neural network.

8. The method of claim 6, which provides the set of pre-processed images of the embryo, classified and ranked to an expert system characterized in that it includes a calculation of a number to be assigned to the automatic evaluation of a human embryo comprising a generator of images of an embryo at a specific day of development (between day 5 to 7) including a convolutional network that calculates from a set of images of a set of embryos a future quality that allows ranking the embryos, assigning them a probability for successful implantation which is determined by the assigned probability index, in such a way that the implantation is successful and results in a live birth.

9. The method of claim 8, characterized in that the reconstruction images, pattern comparison patterns and/or the set of images that are generated of each of the embryos are indistinctly in 2D, 3D, or 4D.

10. The method of claim 1, wherein a set of micrographs is taken by a light emitting diode; a complementary metal-oxide semiconductor (CMOS) image sensor; and an objective lens connected to the CMOS image sensor, wherein the micrographs are pre-processed to obtain from them a set of images derived from the first set, which represent stages of development of different embryos to which a viability potential is assigned using a neural network that allows them to be contrasted with a set of patterns, each representing a different physical or physiological characteristic; where each characteristic is assigned a probability value that defines its ranking from the rest of the set of images and consequently of embryos to be implanted according to their ranking in a patient to result in a successful pregnancy and a live birth.

* * * * *